United States Patent [19]

Shu et al.

[11] Patent Number: 5,571,635
[45] Date of Patent: Nov. 5, 1996

[54] ELECTROLYTE FOR A SECONDARY CELL

[75] Inventors: Zhi X. Shu, Ottawa; Roderick S. McMillan; John J. Murray, both of Gloucester, all of Canada

[73] Assignee: National Research Council of Canada, Ottawa, Canada

[21] Appl. No.: 540,247

[22] Filed: Oct. 6, 1995

Related U.S. Application Data

[63] Continuation-in-part of Ser. No. 228,502, Apr. 15, 1994, Pat. No. 5,529,859.

[51] Int. Cl.$^6$ ..................................... H01M 6/14
[52] U.S. Cl. .......................... 429/194; 424/196; 424/197; 424/198; 424/199; 424/218
[58] Field of Search ..................... 429/194, 196, 429/197, 198, 199, 218

[56] References Cited

U.S. PATENT DOCUMENTS

| | | | |
|---|---|---|---|
| 5,028,500 | 7/1991 | Fong et al. | 429/194 |
| 5,130,211 | 7/1992 | Wilkinson et al. | 429/198 |
| 5,352,548 | 10/1994 | Fujimoto et al. | 429/197 |
| 5,356,736 | 10/1994 | Kita et al. | 429/197 |
| 5,437,775 | 8/1995 | Dittrich et al. | 204/186 |

FOREIGN PATENT DOCUMENTS

| | | | |
|---|---|---|---|
| 1265580 | 2/1990 | Canada | 319/37 |
| 62-290071 | 12/1987 | Japan | H01M 10/40 |
| 62-290072 | 12/1987 | Japan | H01M 10/40 |

OTHER PUBLICATIONS

Shu et al "Electrochemical Intercalation . . . Graphite" J. Electrochem Soc. 140: 4: 922–7; 1993 (Month N/A).
Shu et al "Effect of 12 Crown 4 . . . Graphite" J. Electrochem Soc. 140: 6: L101–3; 1993 (Month N/A).
Dahn et al "Dependence . . . Crystal Structure of Carbon" Electrochemicia Acta 38: 1179–91; 1993 (Month N/A).

*Primary Examiner*—M. Nuzzolillo
*Attorney, Agent, or Firm*—G. Ronald Bell & Associates

[57] ABSTRACT

A conventional electrolyte for a secondary cell having a carbonaceous anode is comprised of an alkali metal salt dissolved in an organic electrolyte solvent. Intercalation and de-intercalation during repeated discharge/charge cycles of the secondary cell using a conventional electrolyte solvent causes continual exposure of bare surfaces of the carbonaceous material to the electrolyte, resulting in continual consumption of electrolyte in the formation of new passivation films on the bared or partially covered surfaces, adversely affecting the performance and capacity of the cell. In accordance with the present invention, the organic electrolyte solvent comprises chloroethylene carbonate, propylene carbonate and ethylene carbonate. The chloroethylene carbonate is capable of forming a very stable passivation film on the anode. The performance and capacity of the secondary cell is improved substantially by the addition of the halogenated organic solvent.

15 Claims, 7 Drawing Sheets

ELECTROLYTE FOR A SECONDARY CELL

CROSS-REFERENCE TO RELATED APPLICATION

This application is a continuation-in-part of our application Ser. No. 08/228,502, filed Apr. 15, 1994, now U.S. Pat. No. 5,529,859.

FIELD OF THE INVENTION

The present invention relates to secondary cells and, in particular, to electrolytes for secondary cells.

BACKGROUND OF THE INVENTION

Concerns about the impact of the disposal of batteries on the environment have led to the development and improvement of rechargeable cells, also referred to as secondary cells by those skilled in the art.

Non-aqueous alkali metal secondary cells typically include an anode of an alkali metal, such as lithium, potassium or sodium, an electrolyte prepared from an alkali metal salt dissolved in an organic solvent, and a cathode of an electrochemically active material, typically a chalcogenide of a transition metal. During discharge, alkali metal ions from the anode pass through the electrolyte to the cathode where the ions are taken up with a simultaneous release of electrical energy. During charging, the flow of ions is reversed so that alkali metal ions pass from the cathode through the electrolyte and are plated on the anode.

During each discharge/charge cycle, small amounts of the alkali metal and electrolyte are consumed by chemical reactions at newly created surfaces on the alkali metal of the anode. This reaction condition is further aggravated by the tendency of the alkali metal to form dendrites as it is plated back onto the anode. The dendrites continue to grow until they eventually contact the cathode, thereby causing the cell to fail. Furthermore, the alkali metal may not cohesively plate onto the anode during the charge cycle, resulting in the formation of spongy deposits near the surface of the anode. The spongy deposits are not in electrically conductive contact with the anode and eventually may adversely affect the capacity of the cell.

This consumption of the alkali metal may be minimized by providing a sheet-like microporous separator on the surface of the alkali metal and by applying substantial pressure on the separator and the anode, so that the alkali metal is deposited on the anode in the form of a layer, thereby preventing the growth of dendrites and spongy deposits. Typically, pressure is applied as an inter-electrode pressure, also referred to by those skilled in the art as "stack pressure". However, only cells with cylindrical symmetry are capable of withstanding the stack pressure with a thin metal casing. Rectangular and coin-shaped cells would require very thick metal casings in order to withstand the stack pressure without excessive flexing. However, the cell would then be significantly larger and more expensive to produce.

Furthermore, microporous separators which are capable of preventing dendritic penetration and withstanding the applied stack pressure are typically very expensive. However, there is still a risk that the microporous separator will be punctured by dendritic growth. As a result, long recharge times are required to reduce the risk of puncture. Unfortunately, the risk of puncture increases with repeated chargings even at low rates, thereby limiting the number of discharge/charge cycles which may be obtained during the life of the cell.

Even when a microporous separator and the appropriate stack pressure are used, a small percentage of the alkali metal is still consumed during each discharge/charge cycle. Thus, in order to attain a practical cell life, a substantial excess of the alkali metal is required in the cell, thereby significantly increasing the cost and size of the cell.

Moreover, alkali metals are extremely reactive and have low melting points. Accordingly, excess heat generated during extended operation, especially in relatively large cells, may lead to melting of the anode. Such melting may not only render the cell inoperative, but could also lead to an undesirable reaction between the alkali metal and electrolyte and to direct contact between the molten alkali metal and the electrochemically active material of the cathode, resulting in a vigorous reaction that could rupture the cell casing.

Thus, there is a need for a secondary cell which will provide the advantages provided by an alkali metal anode, but which will not have the drawbacks associated with this type of cell. One approach has been to replace the alkali metal anode with a carbonaceous anode formed by a carbonaceous material intercalated with alkali metal ions to form compounds of the formula $M_xC$, wherein M represents an alkali metal. In operation of the cell, alkali metal ions pass from the intercalated carbonaceous material through the electrolyte to the cathode. When the cell is recharged, the alkali metal ions are transferred back to the anode for re-intercalation with the carbonaceous material, thereby preventing the formation of dendrites or spongy deposits. A secondary cell containing a carbonaceous anode is also known as an alkali metal ion cell. Furthermore, melting of the anode cannot occur, even under extended periods of operation, because the alkali metal of the anode is not in a metallic form.

Suitable carbonaceous materials include graphite, coke, carbon fibre, pyrolytic carbon, non-graphitizable carbon and chemically modified carbon. Different forms of carbonaceous material which are at least partially crystalline can be characterized by their respective degrees of graphitization. The term "degree of graphitization" refers to the value g according to the formula:

$$g = \frac{3.45 - d_{002}}{0.085}$$

wherein $d_{002}$ represents the spacing (Å) between the graphitic layers of the carbonaceous material in the crystal structure, determined by standard X-ray diffraction techniques, and g represents a dimensionless number with a value between 0 and 1.0. In general, carbonaceous material having a high degree of graphitization, for example graphite, has a more ordered microstructure, whereas carbonaceous material having a low degree of graphitization, for example coke, has a less ordered microstructure. A high degree of graphitization in the carbonaceous material of the anode provides a higher cell capacity in conjunction with less variation of cell voltage.

The voltage profile, reversibility and final stoichiometry of the alkali metal-intercalated carbonaceous material is dependent on the structure of the carbonaceous material. For example, petroleum coke has a turbostatic structure, shows a steep voltage profile, and intercalates up to a stoichiometry of $Li_{0.5}C_6$. On the other hand, graphite has a nearly perfect layered structure and is able to intercalate up to a stoichiometry of $LiC_6$, with a flat voltage curve near zero volts relative to lithium. The theoretical capacity of a graphite anode is 372 mAh/g based on the stoichiometry of $LiC_6$, thereby making graphite one of the most desirable candidates for a carbonaceous anode material (Shu, Z. X. et al "Electrochemical Intercalation of Lithium into Graphite" J Electrochem Soc 140: 4: 922–927; 1993).

Canadian Patent Number 1,265,580 (Yoshino, A. et al, Feb. 6, 1990) discloses a secondary cell wherein the anode is made of carbonaceous material into which alkali metal ions may be intercalated reversibly and the cathode is made of an active material consisting of a sulfide or an oxide of a transition metal. Highly graphitic carbonaceous materials such as graphite are inexpensive, non-toxic and are capable of incorporation into secondary cells having relatively high specific capacities.

However, the structural properties of a carbonaceous material and consequently the interaction of the carbonaceous material with the electrolyte have hitherto posed limitations on universal application of an electrolyte system. In other words, an electrolyte which works well for one type of carbonaceous material does not necessarily work for another type. The dominant factor lies in the degree of graphitization of a carbonaceous material.

Carbonaceous materials with a degree of graphitization of about 1.0 have a highly ordered layered structure where the size of crystallites is larger than those with a degree of graphitization less than 0.4. Carbon layers in these materials are perfectly parallel to each other. This structure is in contrast to the turbostratic structure of carbonaceous materials with lower degrees of graphitization. Graphite falls into this category of carbonaceous materials.

There are numerous problems associated with the use of a carbonaceous anode. In particular, compounds of the formula $M_xC$ are reactive materials which are difficult to handle in air. Accordingly, the anode is preferably produced in situ in a cell by an initial intercalation step. However, some of the alkali metal ions and the electrolyte are consumed in an irreversible reaction in the initial intercalation step. This irreversible reaction results in an initial capacity loss for the cell which reduces the overall performance thereof.

Without being bound by theory, it is believed by those skilled in the art that the reaction which occurs during the initial intercalation step involves the formation of a passivation film on the bare surfaces of the carbonaceous material by decomposition of electrolyte salt and/or solvent. The ideal passivation film is insoluble in the electrolyte and is an electronic insulator and an ionic conductor for alkali metal ions and thus protects the electrolyte from decomposition on bare carbonaceous material surfaces. However, while the passivation film is being formed, additional bare surfaces of the carbonaceous material can be exposed to electrolyte. This is believed by some (for example, Wilkinson, D. P. et al, U.S. Pat. No. 5,130,211 issued Jul. 14, 1992) to occur by co-intercalation of electrolyte solvent leading to exfoliation and thus an increase in the surface area of the carbonaceous material.

It is believed that bare surfaces can also be exposed by at least two other methods. Firstly, the passivation film may be ruptured by the formation of gaseous products arising from the reduction of electrolyte solvent by intercalated carbonaceous material (Shu, Z. X. et al "Effect of 12 Crown 4 on the Electrochemical Intercalation of Lithium into Graphite" J Electro Soc 140: 6: L101–L103; 1993) and secondly, by changing the layer spacing of the carbonaceous material, in particular graphite, as alkali metal ions intercalate therein. This change in the layer spacing can rupture the passivation film exposing bare surfaces on the carbonaceous material. Layer spacing changes can also occur during alkali metal ion de-intercalation from carbonaceous material resulting in further passivation film rupture, bare surface exposure and the formation of a new passivation film on the resultant bared or partially covered surfaces.

Regardless of whether electrolyte solvent is co-intercalated, gaseous products are formed or the layer spacing is changed, intercalation and de-intercalation of alkali metal ions cause continual exposure of bare surfaces to electrolyte, thereby resulting in continual consumption of electrolyte in the formation of new passivation films. Thus, the passivation film is not stable to repeated intercalation and de-intercalation of alkali metal ions into the carbonaceous material during discharge/charge cycles so that concomitant electrolyte consumption and passivation film growth occurs. If this process continues unabated, then, with repeated cell discharge/charge cycles, the internal impedance of the cell will increase and, between fixed cell voltage limits, will result in progressive loss of capacity. Accordingly, it becomes difficult to attain the theoretical capacity of the carbonaceous material, which for example is thought to be 372 mAh/g for graphite. This progressive loss is commonly referred to by those skilled in the art as "capacity fade".

Accordingly, there is a requirement for an electrolyte which is capable of forming a stable passivation film using as little electrolyte as possible.

U.S. Pat. No. 5,028,500 (Fong, R. et al, Jul. 2, 1991) describes two solutions to prevent excessive electrolyte decomposition at highly graphitic carbonaceous intercalation hosts and the consequent loss of cell capacity and performance properties. The first is to form a dual phase carbonaceous intercalation host having a mean degree of graphitization of at least 0.40, the first phase having a degree of graphitization greater than 0.40 and the second phase having a degree of graphitization less than 0.40. The other approach maintains the carbonaceous intercalation host at a temperature greater than about 50° C. during the initial intercalation of the host with lithium. Both approaches reduced electrolyte decomposition during the initial intercalation step, thereby improving the cell performance and capacity. However, a solution to electrolyte decomposition that does not require the replacement of single-phase highly graphitic intercalation hosts or heat treatment would be highly desirable.

Graphite is considered to be a desirable carbonaceous material for the anode in a lithium ion battery. This is because graphite has several features which cannot be offered by other types of carbonaceous materials, for example, coke. However, direct substitution of a coke anode by a graphite anode in a lithium ion battery is not as simple as it may seem. A number of studies have found that certain electrolyte systems, in particular propylene carbonate (PC) based electrolytes, which work with a coke anode do not work with a graphite anode. The primary reason for this is that a massive amount of electrolyte is decomposed at the graphite anode. This process irreversibly consumes lithium which must come from electrolyte salt and/or the cathode and electrolyte solvents. As a result, in order to use graphite as an anode, a lithium ion battery must have an excess built-in of electrolyte and of cathode material, which in effect increases the cost and reduces the energy density of a lithium ion battery.

Furthermore, one of the products of the reaction between propylene carbonate and graphite is propylene gas. In a sealed lithium ion cell, the gas produced will increase the pressure inside a cell. A built-in product feature which either contains the pressure inside the battery casing by reinforcing the cell can or incorporates a pressure releasing device inside the cell must be added in a lithium ion battery. This, of course, adds extra cost to a lithium ion battery and complicates the design and engineering of a battery casing.

As described in U.S. Pat. No. 5,028,500, carbon having a high degree of graphitization provides significant advantages with respect to charge capacity or maximum value of x in $Li_xC_6$, and also with respect to voltage stability during operation. However, attempts to use a carbon having a degree of graphitization above about 0.40 as active material in an electrode of an alkali metal ion cell typically result in substantial irreversible reactions which cause substantial initial capacity losses.

Excessive electrolyte decomposition during the initial intercalation step of a highly graphitic carbonaceous intercalation host has also been suppressed by addition of a sequestering agent, such as a crown ether, as disclosed in U.S. Pat. No. 5,130,211 (Wilkinson, D. P. et al, Jul. 14, 1992). The crown ether chelates with alkali metal and prevents both electrolyte solvent co-intercalation into the carbonaceous host and exfoliation of the carbonaceous host. Hence, the increase in surface area of carbonaceous materials is prevented and excessive electrolyte decomposition is reduced.

The use of crown ether as a sequestering agent was further explored by Shu, Z. X. et al ("Effect of 12 Crown 4 on the Electrochemical Intercalation of Lithium into Graphite" J Electro Soc 140: 6: L101–L103; 1993). The crown ether was found to suppress electrolyte solvent decomposition by minimizing formation of gaseous products which, as discussed hereinabove, is believed to result in exposure of bare surfaces to the electrolyte, consumption of electrolyte and formation of a new passivation film on the bared or partially covered surfaces. However, crown ethers are expensive and generally highly toxic. Accordingly, there is a requirement for a viable alternative to the use of crown ethers.

It is an object of the present invention to improve the performance and the overall capacity of secondary cells by minimizing electrolyte decomposition. It is another object of the present invention to reduce the capacity loss during the initial intercalation step.

SUMMARY OF THE INVENTION

According to one aspect of the present invention, there is provided an electrolyte for a secondary alkali metal ion cell including an anode of a carbonaceous material having a degree of graphitization (g) of about 1.0, as determined by the equation:

$$g = \frac{3.45 - d_{002}}{0.085}$$

wherein $d_{002}$ represents the spacing (Å) between the graphitic layers in the crystal structure of the carbonaceous material, said carbonaceous material being capable of having alkali metal ions reversibly incorporated therein, the electrolyte comprising a solution of chloroethylene carbonate, an alkali metal salt dissolved therein and propylene carbonate.

A preferred aspect of the invention provides an electrolyte for a secondary alkali metal ion cell including an anode of a carbonaceous material having a degree of graphitization (g) of about 1.0, as determined by the equation:

$$g = \frac{3.45 - d_{002}}{0.085}$$

wherein $d_{002}$ represents the spacing (Å) between the graphitic layers in the crystal structure of the carbonaceous material, said carbonaceous material being capable of having alkali metal ions reversibly incorporated therein, the electrolyte comprising a solution of chloroethylene carbonate, an alkali metal salt dissolved therein, ethylene carbonate and propylene carbonate.

According to another aspect of the present invention, there is provided a secondary alkali metal ion cell, comprising a source of alkali metal ions, an anode of a carbonaceous material having a degree of graphitization (g) of about 1.0, as determined by the equation:

$$g = \frac{3.45 - d_{002}}{0.085}$$

wherein $d_{002}$ represents the spacing (Å) between the graphitic layers in the crystal structure of the carbonaceous material, said carbonaceous material being capable of having the alkali metal ions reversibly incorporated therein, a cathode of an electrochemically active material capable of having the alkali metal ions reversibly incorporated therein, and a substantially non-aqueous electrolyte comprising chloroethylene carbonate, a salt of the alkali metal dissolved therein and propylene carbonate.

Another preferred aspect of the invention provides a secondary alkali metal ion cell, comprising a source of alkali metal ions, an anode of a carbonaceous material having a degree of graphitization (g) of about 1.0, as determined by the equation:

$$g = \frac{3.45 - d_{002}}{0.085}$$

wherein $d_{002}$ represents the spacing (Å) between the graphitic layers in the crystal structure of the carbonaceous material, said carbonaceous material being capable of having the alkali metal ions reversibly incorporated therein, a cathode of an electrochemically active material capable of having the alkali metal ions reversibly incorporated therein, and a substantially non-aqueous electrolyte comprising chloroethylene carbonate, a salt of the alkali metal dissolved therein, ethylene carbonate and propylene carbonate.

It will be understood that the term "incorporating" also encompasses intercalation.

The novel electrolyte system of the present invention describes the use of a chloroethylene carbonate, propylene carbonate and, optionally, ethylene carbonate electrolyte system with carbonaceous materials having a degree of graphitization of about 1.0. This system allows the use of propylene carbonate-based electrolytes in a lithium ion battery containing a graphite anode without incurring a massive amount electrolyte decomposition at the graphite anode. This finding is CONTRARY to the common wisdom held by those having ordinary skill in the art that propylene carbonate decomposes substantially at the graphite anode and CANNOT be used with a graphitic anode in a conventional electrolyte.

In general, a desirable electrolyte solvent should at least have the following properties:

(i) stability over a wide range of electrochemical potentials to accommodate cathode voltages (ii) a high dielectric constant (iii) a high ionic conductivity (iv) a wide liquid range (v) stable in presence of other components of a battery.

In addition, cost and toxicity of an electrolyte solvent are common concerns. Propylene carbonate is less toxic and cheaper than either diethyl carbonate or dimethyl carbonate. It also offers an unparalleled wide liquid range. The following table shows liquid range, dielectric constant and viscosity of propylene carbonate and several other electrolyte solvents. It is clear that propylene carbonate is suitable for battery operation at both warm (dictated by the boiling point) and cold (dictated by the melting point) temperatures. In addition, propylene carbonate super-cools and remains in the liquid state well below its melting point.

The wide liquid range of propylene carbonate makes it an extremely attractive solvent to those having ordinary skill in the art and several unsuccessful attempts have previously been made to incorporate it in an electrolyte system for a lithium ion battery containing an anode with a high degree of graphitization, such as g=1.0.

TABLE I

Physical Properties of Various Electrolyte Solvent at 25° C. Unless Otherwise Stated

| Electrolyte Solvents | b.p. (°C.) | m.p. (°C.) | Dielectric Constant | Viscosity (cP) |
|---|---|---|---|---|
| Dimethyl Carbonate | 90 | 2–4 | not available | |
| Diethyl Carbonate | 126–128 | −43 | 3.15 | not available |
| Propylene Carbonate | 240 | −55 | 64.4 | 2.53 |
| Ethylene Carbonate | 248 | 37.39 | 89.6(40°) | 1.85(40°) |
| Chloroethylene Carbonate | 121–123 at 18 mmHg | | not available | |

BRIEF DESCRIPTION OF THE DRAWINGS

In drawings which illustrate embodiments of the present invention.

DETAILED DESCRIPTION OF THE PREFERRED EMBODIMENTS

In accordance with the present invention, an electrolyte for a secondary cell having a carbonaceous anode comprises a mixture of chloroethylene carbonate and propylene carbonate. If desired, part of the chloroethylene carbonate is replaced by ethylene carbonate.

As mentioned above, it is known to use an organic solvent as an electrolyte solvent in cells having an alkali metal anode or a carbonaceous anode. However, it was not known that the use of the specified co-solvents with a cell having a carbonaceous anode material would reduce excessive electrolyte decomposition by forming a stable passivation film on the surfaces of the carbonaceous anode material.

Without being bound by theory, it is believed that the chloroethylene carbonate results in a more effective electrolyte because it forms a passivation film at a higher emf than conventional electrolyte solvents. In the initial intercalation of the carbonaceous material of the anode, the chloroethylene carbonate undergoes electrochemical reduction at an emf substantially higher than that of conventional electrolyte solvents. Accordingly, a stable passivation film is formed on the surfaces of the carbonaceous material. The stable passivation film is insoluble in the electrolyte solvent and is an electronic insulator and an ionic conductor for alkali metal ions.

The formation of a stable passivation film on the carbonaceous material of the anode significantly reduces electrolyte decomposition and concurrent consumption of alkali metal ions. Accordingly, the use of the halogenated organic solvent reduces the loss of cell capacity and improves the performance and life of the cell.

The substantially non-aqueous electrolyte of the present invention is formed of a salt of an alkali metal dissolved in the specified solvent mixture. The solvent may also be used as a supplement to a conventional electrolyte solvent. The electrolyte can be a liquid, paste-like or a solid. Preferably, the electrolyte is in liquid form.

The minimum volume ratio of the chloroethylene carbonate to the propylene carbonate in a mixture thereof is dependent on the efficiency with which the chloroethylene carbonate forms a stable passivation film on the surfaces of the carbonaceous material of the anode. The efficiency of the solvent to form a stable passivation film on a particular carbonaceous material with a known surface area can be readily determined by one of ordinary skill in the art without undue experimentation. This is best determined by preparing test cells, as will be discussed in Examples presented below, and determining the degree of cell capacity loss that occurs with each halogenated organic solvent or at various concentrations in a mixed solvent.

Chloroethylene carbonate, although it has the desirable properties, is expensive. In addition, chloroethylene carbonate contains a chlorine atom and is considered to be more toxic and less environmentally friendly than ethylene carbonate. The amount of chloroethylene carbonate required in the system can be reduced, while maintaining the irreversible capacity at a level similar to those shown with the bi-solvent system, by replacing a portion of the chloroethylene carbonate with ethylene carbonate, to create the tri-solvent electrolyte system. Advantageously, the volume fraction of chloroethylene carbonate in the tri-solvent system will range from 0.01 to 0.30, more preferably from 0.05 to 0.2. Higher proportions of chloroethylene carbonate can also be used, but do not give rise to additional advantages.

The electrolyte salt is a salt of the alkali metal ion used in the secondary cell and should be compatible with chloroethylene carbonate, propylene carbonate, ethylene carbonate, the carbonaceous material of the anode and the electrochemically active material of the cathode. When the alkali metal ions of the secondary cell are, for example, lithium ions, suitable lithium electrolyte salts include $LiAsF_6$, $LiPF_6$, $LiClO_4$, $LiBF_4$, $LiCF_3SO_3$, $LiC(CF_3SO_2)_3$, $LiN(CF_3SO_2)_2$, $LiI$, $LiBr$, $LiCl$, $LiB(C_4H_4)_4$, $LiSO_3F$, $LiAlCl_4$ and mixtures thereof.

The concentration of the alkali metal salt in the electrolyte solvent is preferably from about 0.5 M to 1.5 M.

The electrolyte may also contain an additive such as a crown ether, for example 12 crown 4, 15 crown 5 and 18 crown 6, an immobilizing agent, for example polyethylene oxide, or an inorganic gel-forming compound, for example $SiO_2$ and $Al_2O_3$.

Figure 1:
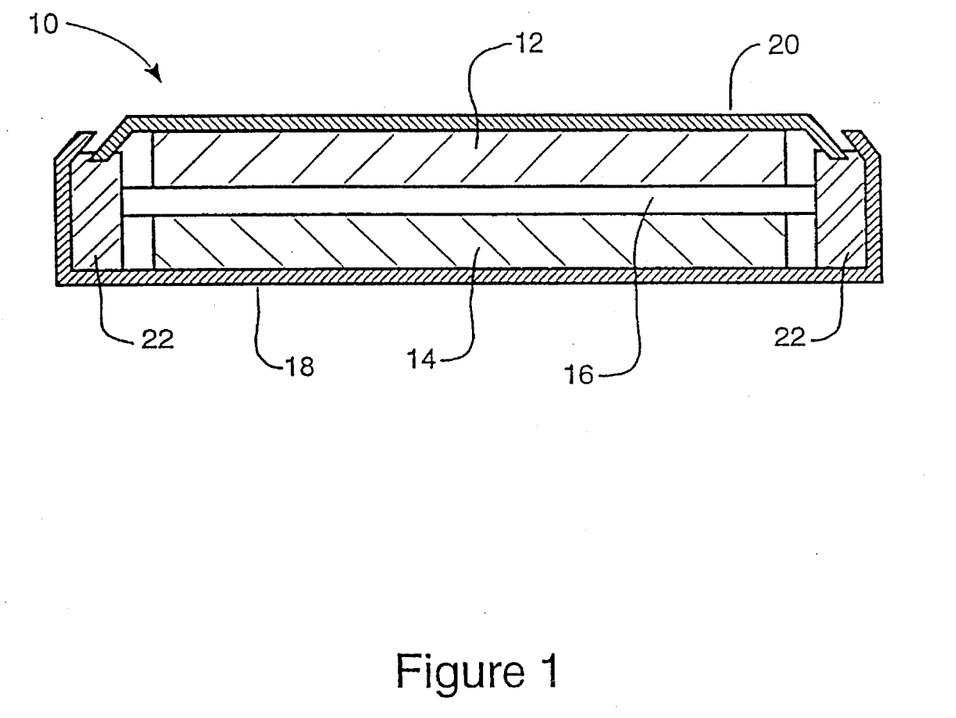
FIG. 1 is a cross-sectional view of a secondary coin cell according to one embodiment of the present invention.

Referring now to FIG. 1, a non-aqueous secondary cell 10 according to one embodiment of the present invention has an anode 12 and a cathode 14 separated by a separator 16, such as a porous separator. The cell shown in FIG. 1 is a coin cell 10. However, it will be appreciated by those skilled in the art that the layered structure of the anode 12, the cathode 14 and the separator 16 can be adapted for a rectangular or cylindrical cell.

The layered structure of the anode 12, the cathode 14 and the separator 16 is placed or assembled in a metallic container having a bottom 18, which acts as a current collector and terminal for the cathode 14, and a top 20, which serves as a current collector and terminal for the anode 12. An electronic insulating ring 22, such as a polypropylene ring, is placed between the bottom 18 and the top 20 of the container. Electrolyte is then injected into the cell 10 and the components of the coin cell 10 are crimped together by bending the top edge of the bottom 18 inwards against the electronic insulating ring 22 to form a gas-tight seal.

In accordance with the present invention, the anode 12 is formed of a carbonaceous material capable of reversibly intercalating alkali metal ions. Suitably, the carbonaceous material of the anode 12 has a degree of graphitization g of about 1.0.

Preferably, the anode 12 is a powdered form of carbonaceous material, for example, synthetic graphite, such as KS15 ™ graphite powder (Lonza), natural graphite, isotropic graphite, carbon fibre, pyrolytic carbon, nongraphitizable carbon, or chemically modified carbon. Isotropic graphite can be prepared, for example, from a mixture of graphite and carbonized pitch or a mixture of heat-treated fluid coke and commercial graphite, wherein the initial intercalation of alkali metal ions is performed at or above a temperature of about 50° C. (U.S. Pat. No. 5,028,500, Fong, R. et al, Jul. 2, 1991). The chemically modified carbon includes carbon which incorporates other elements such as Al, Si, B, N, P or a mixture thereof. The carbonaceous material may be prepared by carbonization of furan resins (as described in U.S. Pat. No 4,959,281, Azuma, H. et al, Sep. 25, 1990) with a layer spacing ($d_{002}$) less than or equal to about 3.70 Å and a density greater than or equal to about 1.70 $g/cm^3$. The carbonized furan resins may be doped with from about 2 to 5% phosphorus. The carbonaceous material may also be prepared by doping oxygenated petroleum or coal pitch with from about 2 to 5% phosphorous (European Patent Application Number 0 418 514 A1, Azuma, H. et al, Mar. 27, 1991). A suitable carbonaceous material may also be prepared by thermal decomposition of gas phase hydrocarbons or hydrocarbon compounds with a $d_{002}$ of from about 3.37 to 3.55 Å (U.S. Pat. No. 4,863,814, Mohri, M. et al, Sep. 5, 1989). Another suitable carbonaceous material is prepared from mesophase microspheres with a $d_{002}$ layer spacing of about 3.45 Å (U.S. Pat. No. 5,153,082, Ogimo, T. et al, Oct. 6, 1992).

The carbonaceous material of the anode 12 may be incorporated with alkali metal ions prior to assembly of the cell 10. Suitable alkali metal ions include sodium, potassium and lithium ions. The preferred alkali metal ions are lithium ions. However, as discussed earlier, compounds of the formula $M_xC$. are reactive materials that are difficult to handle in air. Accordingly, it is preferable that the carbonaceous material is intercalated in situ in the cell 10 by supplying a source of alkali metal ions for the initial intercalation. This can be accomplished in a number of ways including using a cathode material having alkali metal ions incorporated therein, providing a so-called "sacrificial" sheet of alkali metal or by using a higher concentration of alkali metal ions in the electrolyte. Preferably, the alkali metal ions are introduced to the carbonaceous material of the anode 12 via the cathode 14.

When the cell 10 is assembled with a cathode material having alkali metal ions incorporated therein, the cell 10 is in the discharged state. The alkali metal ions are induced to intercalate with the carbonaceous material of the anode 12 by applying an externally generated electrical potential to charge the cell 10 and to draw alkali metal ions from the cathode 14 through the electrolyte and into the carbonaceous material of the anode 12.

The cathode 14 consists of an electrochemically active material, such as, a chalcogenide of a transition metal. Chalcogens include oxygen, sulfur, selenium, tellurium and polonium. Preferred transition metals include manganese, nickel, iron, chromium, titanium, vanadium, molybdenum and cobalt.

Preferably, the electrochemically active material of the cathode 14 having alkali metal ions incorporated therein is stable in air. Examples of suitable electrochemically active materials include alkali metal oxides and alkali metal sulfides of nickel, cobalt, tin, manganese, iron, chromium, titanium, vanadium, molybdenum and mixtures thereof, such as, alkali metal nickel oxides, alkali metal cobalt oxides and alkali metal mixed oxides of cobalt with nickel or tin. For example, when the alkali metal ions are lithium ions, suitable lithiated electrochemically active materials are lithiated oxides of the formula $Li_xRO_2$, wherein R represents Co, Ni, Mn, Fe, Sn and Cr or a mixture thereof, for example $Li_xNiO_2$, $Li_xCoO_2$, $Li_xMnO_2$, $Li_xCo_{0.92}Sn_{0.06}O_2$ and $Li_xCo_{1-x}Ni_xO_2$, and other lithiated transition metal chalcogenides such as $LiTiS_2$, $LiVS_2$ and $LiVSe_2$. Another class of lithiated compounds suitable for use as an electrochemically active material is $Li_xCr_{1-x}Mn_xO_2$, as disclosed in U.S. Pat. No. 5,370,949 (Davidson, I. J. et al) issued Dec. 6, 1994, which is incorporated by reference herein. Co-pending U.S. patent application Ser. No. 08/104,639 (filed Aug. 11, 1993 by Davidson, I.J. et al), incorporated by reference herein, discloses the use of orthorhombic $LiMnO_2$ also suitable for use as an electrochemically active material. Other suitable lithiated materials include $Li_xMn_2O_4$ and lithiated chevrel-phase materials.

In the case wherein the electrochemically active material does not act as the source of alkali metal ions, preferred chalcogens of transition metals are molybdenum sulfides, vanadium oxides and manganese oxides, for example $MoS_2$, $V_6O_{13}$, $Mo_6S_8$ or $MnO_2$.

The carbonaceous material of the anode 12 and the electrochemically active material of the cathode 14 are typically held together with a binder in an amount sufficient to bind the components.

Suitable binders for both the carbonaceous material of the anode 12 and the electrochemically active material of the cathode 14 include a polymer of ethylene propylene diene monomer, polyethylene oxide, a polyfluorinated hydrocarbon, such as polytetra-fluoroethylene, polyhexafluoropropylene, polyvinyldiene fluoride, polyvinylidene difluoride and mixtures thereof. The binder is dissolved or dispersed in a liquid carrier which is typically evaporated after the anode 12 or cathode 14 is formed.

It is desirable that the cathode 14 maintain its electrical conductivity at all states of charge. Furthermore, expansion and contraction of the anode 12 during a discharge/charge cycle can cause carbonaceous particles to lose electrical contact with one another with a concomitant decrease in electrical conductivity. Conductivity may be enhanced by adding an electrically-conductive material, such as graphite or carbon black, to the cathode 14 or the anode 12.

The coin cell 10 may be prepared in a manner known to those skilled in the art, for example, by preparing pellets and/or by coating temporary or permanent supports, such as a carrier webs, for the anode 12 and/or the cathode 14.

Pellets of carbonaceous material or electrochemically active material for the production of the anode 12 or cathode 14, respectively, can be prepared in a manner known to those skilled in the art. The particulate carbonaceous material or electrochemically active material is mixed with a conductivity enhancer, if used, and a binder dissolved or dispersed in a carrier liquid. The carrier liquid is evaporated and the resultant mixture is pressed into pellet-form. The formation of the pellet may involve a sintering process.

In a coating process, a slurry of the carbonaceous material of the anode 12 or the electrochemically active material of the cathode 14, in particulate form, the conductivity enhancer, if used, and the binder dissolved or dispersed in a carrier liquid is deposited on a temporary or permanent support (not shown). The carrier liquid is then evaporated.

An example of a temporary support is Teflon. Once the carrier liquid is evaporated, the anode 12 or cathode 14, respectively, is punched or otherwise removed from the temporary support for subsequent assembly in the metallic container of the coin cell 10. A permanent support is a conductive support, for example, a metallic support. The use of a conductive support or carrier web is preferable in the production of, for example, a cylindrical cell.

A layered structure is then formed with the anode 12, the separator 16 and the cathode 14. In the case where the source of alkali metal ions is a sacrificial sheet of alkali metal, the sheet of alkali metal is placed between the anode 12 and the separator 16 so that the sheet lies adjacent to and in contact with the anode 12.

The layered structure is placed or assembled in the metallic container of the coin cell 10 with an electronic insulating ring 22 and electrolyte. The top 20 of the coin cell 10 is placed on the layered structure and the coin cell 10 is crimped together by bending the top edge of the bottom 18 inwards against the electronic insulating ring 22 to form a gas-tight seal.

Alternatively, the cathode 14 may be deposited directly into the container of the cell 10, followed by injection of electrolyte, placement of the separator 16 and the anode 12. Additional electrolyte is injected into the cell 10 and the components of the coin cell 10 are crimped together by bending the top edge of the bottom 18 inwards against the electronic insulating ring 22 to form a gas-tight seal.

The coin cell 10, when assembled, is generally in the discharged state. In the embodiment wherein the electrochemically active material of the cathode 14 has alkali metal ions incorporated therein and in the embodiment wherein the electrolyte is provided with a higher concentration of alkali metal ions, the alkali metal ions are induced to intercalate with the carbonaceous material of the anode 12 by applying an externally generated electrical potential in order to charge the cell 10.

In the embodiment wherein the source of alkali metal ions is a sacrificial sheet of alkali metal, the addition of electrolyte to the cell 10 causes the alkali metal in the sheet to intercalate into the carbonaceous anode material, because the lithiated anode has a lower electrochemical potential than the non-lithiated anode.

It will be appreciated by those skilled in the art that, if the source of alkali metal ions is provided by an already intercalated carbonaceous anode, the coin cell 10 is in a charged state.

The following Examples illustrate the invention. The procedures used in the Examples are recognized by those skilled in the art to be indicative of the properties of an actual secondary cell. For example, Dahn, J. R. et al ("Dependence of the Electrochemical Intercalation of Lithium in Carbons on the Crystal Structure of Carbon" Electrochimica Acta 38: 9: 1179–91; 1993) demonstrate the correlations between electrochemical and structural data of carbon materials. The data obtained from the Li/carbon test cells allows general statements about the carbonaceous anodes in lithium ion cells to be made.

EXAMPLE 1

A substantially non-aqueous electrolyte was prepared in a manner known to those skilled in the art with 1M $LiClO_4$ dissolved in a conventional electrolyte solvent comprised of a 1:1 (by volume) mixture of ethylene carbonate and propylene carbonate. The electrolyte did not contain any halogenated organic solvent.

Figure 2:
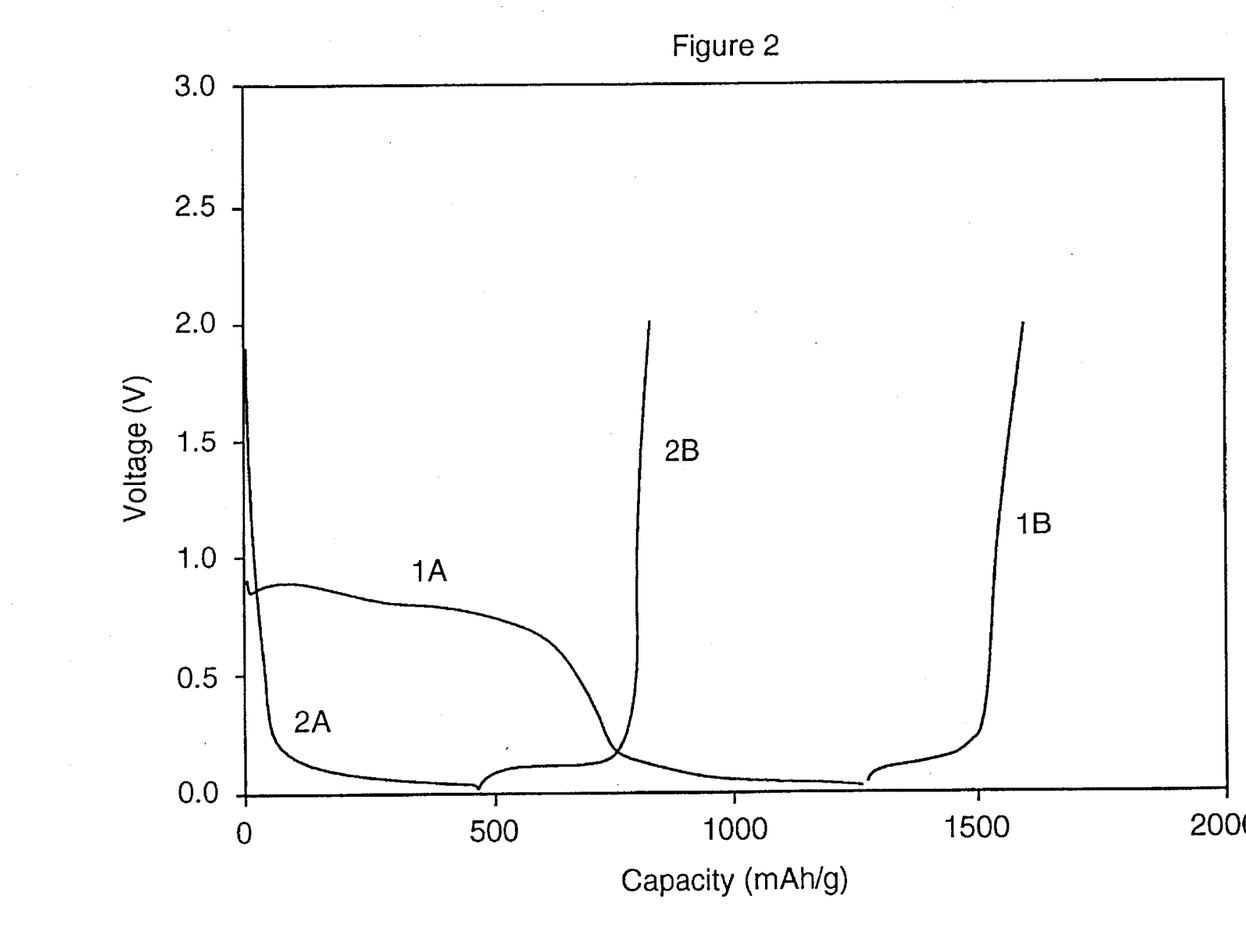
FIG. 2 is a graphical comparison of cell voltage versus specific capacity between a lithium/graphite cell prepared with a conventional electrolyte and a lithium/graphite cell prepared in accordance with another embodiment of the present invention.

A carbonaceous electrode was made of graphite and formed into a pellet in a manner known to those skilled in the art and an Li/graphite test cell was prepared with the electrolyte. The carbonaceous electrode was lithiated by inducing the intercalation of lithium ions from a sheet of lithium metal with a current corresponding to a change of $x=1$ in $Li_xC_6$ over 20 hours. Curve 1A in FIG. 2 represents the voltage/capacity of the initial intercalation step. The subsequent de-intercalation is represented by curve 1B in FIG. 2. The cell of Example 1 without halogenated organic solvent showed substantial irreversible capacity loss.

EXAMPLE 2

A substantially non-aqueous electrolyte was prepared in a manner known to those skilled in the art with 1M $LiClO_4$ dissolved in an electrolyte solvent according to the present invention comprised of a 1:1 (by volume) mixture of chloroethylene carbonate (Aldrich) and propylene carbonate.

A carbonaceous electrode was made of graphite and formed into a pellet in a manner known to those skilled in the art and an Li/graphite test cell was prepared with the electrolyte. The carbonaceous electrode was lithiated by inducing the intercalation of lithium ions from a sheet of lithium metal with a current corresponding to a change of x=1 in $LixC_6$ over 20 hours. Curve 2A in FIG. 2 represents the voltage/capacity of the initial intercalation step. The subsequent de-intercalation is represented by curve 2B in FIG. 2. The cell of Example 2 with halogenated organic solvent demonstrated minimal irreversible capacity loss during the initial intercalation step.

EXAMPLE 3

A substantially non-aqueous electrolyte was prepared in a manner known to those skilled in the art with 1M $LiN(CF_3SO_2)_2$ dissolved in a conventional electrolyte solvent comprised of a 1:1 (by volume) mixture of ethylene carbonate and propylene carbonate. The electrolyte did not contain any halogenated organic solvent.

Figure 3:
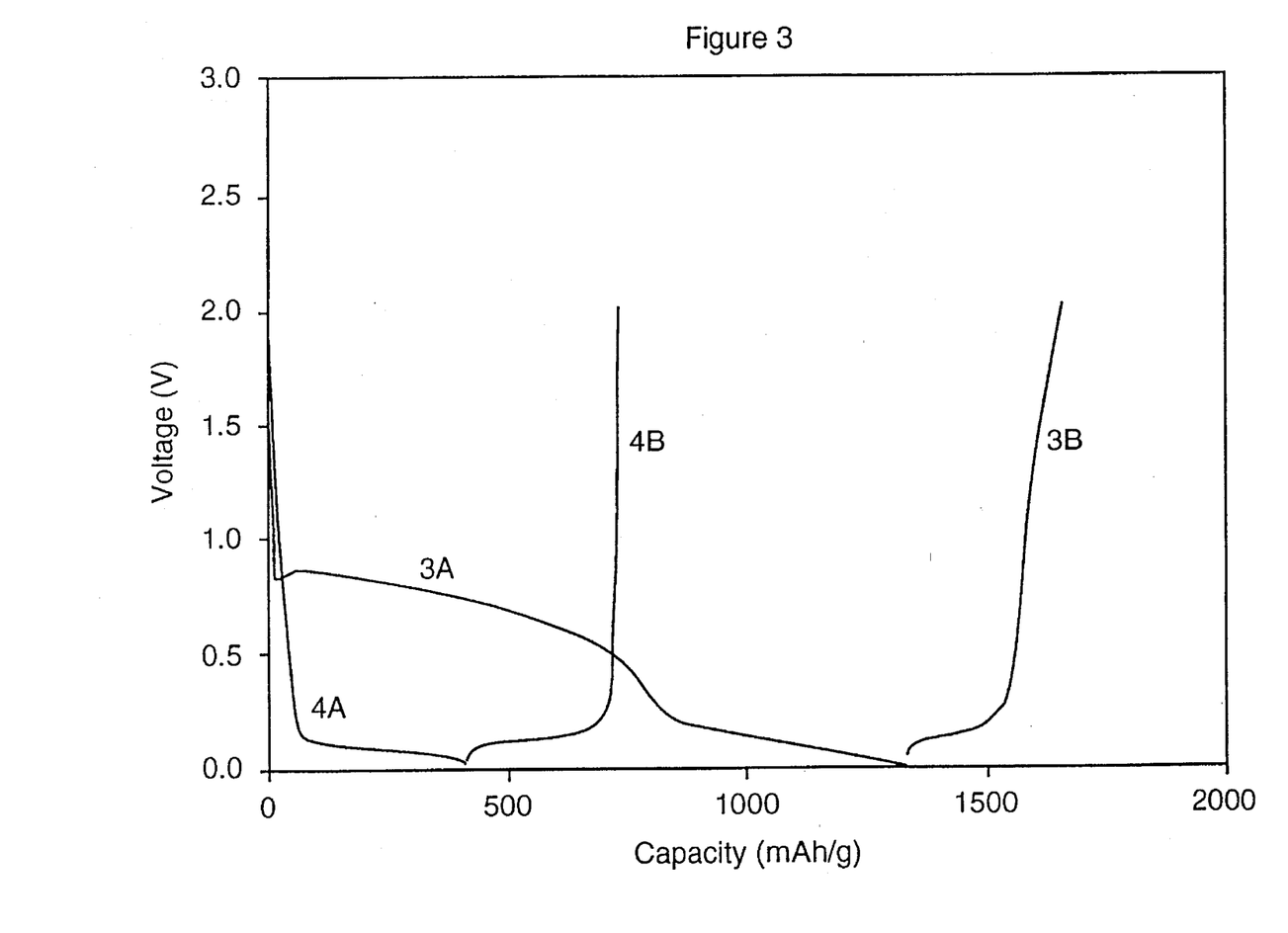
FIG. 3 is a graphical comparison of cell voltage versus specific capacity between a lithium/graphite cell prepared with a conventional electrolyte and a lithium/graphite cell prepared in accordance with a further embodiment of the present invention.

A carbonaceous electrode was made of graphite and formed into a pellet in a manner known to those skilled in the art and an Li/graphite test cell was prepared with the electrolyte. The carbonaceous electrode was lithiated by inducing the intercalation of lithium ions from a sheet of lithium metal with a current corresponding to a change of x=1 in $Li_xC_6$ over 20 hours. Curve 3A in FIG. 3 represents the voltage/capacity of the initial intercalation step. The subsequent de-intercalation is represented by curve 3B in FIG. 3. The cell of Example 3 without halogenated organic solvent showed substantial irreversible capacity loss.

EXAMPLE 4

A substantially non-aqueous electrolyte was prepared in a manner known to those skilled in the art with 1M $LiN(CF_3SO_2)_2$ dissolved in an electrolyte solvent according to the present invention comprised of a 1:1 (by volume) mixture of chloroethylene carbonate (Aldrich) and propylene carbonate.

A carbonaceous electrode was made of graphite and formed into a pellet in a manner known to those skilled in the art and an Li/graphite test cell was prepared with the electrolyte. The carbonaceous electrode was lithiated by inducing the intercalation of lithium ions from a sheet of lithium metal with a current corresponding to a change of x=1 in $Li_xC_6$ over 20 hours. Curve 4A in FIG. 3 represents the voltage/capacity of the initial intercalation step. The subsequent de-intercalation is represented by curve 4B in FIG. 3. The cell of Example 4 with halogenated organic solvent demonstrated minimal irreversible capacity loss during the initial intercalation step.

Table II summarizes the effect of using an electrolyte prepared with a halogenated organic solvent in the Li/graphite test cells of Examples 1 through 4.

TABLE II

| EXAMPLE | IRREVERSIBLE CAPACITY DURING INITIAL INTERCALATION STEP (mAh/g) | REVERSIBLE CAPACITY (mAh/g) |
| --- | --- | --- |
| 1 | 1036 | 315 |
| 2 | 86 | 328 |
| 3 | 975 | 321 |
| 4 | 108 | 359 |

EXAMPLE 5

A substantially non-aqueous electrolyte was prepared in a manner known to those skilled in the art with 1M $LiClO_4$ dissolved in an electrolyte solvent according to the present invention comprised of a mixture of chloroethylene carbonate (Aldrich) and propylene carbonate. The volume fraction of chloroethylene carbonate in the electrolyte was in the range of from 0.1 to 1.0.

Carbonaceous electrodes were made of graphite and formed into pellets in a manner known to those skilled in the art. Li/Graphite test cells were prepared with the electrolytes of varying volume fractions of chloroethylene carbonate. The carbonaceous electrode of each test cell was lithiated by inducing the intercalation of lithium ions from a sheet of lithium metal with a current corresponding to a change of x=1 in $Li_xC_6$ over 20 hours.

Figure 4:
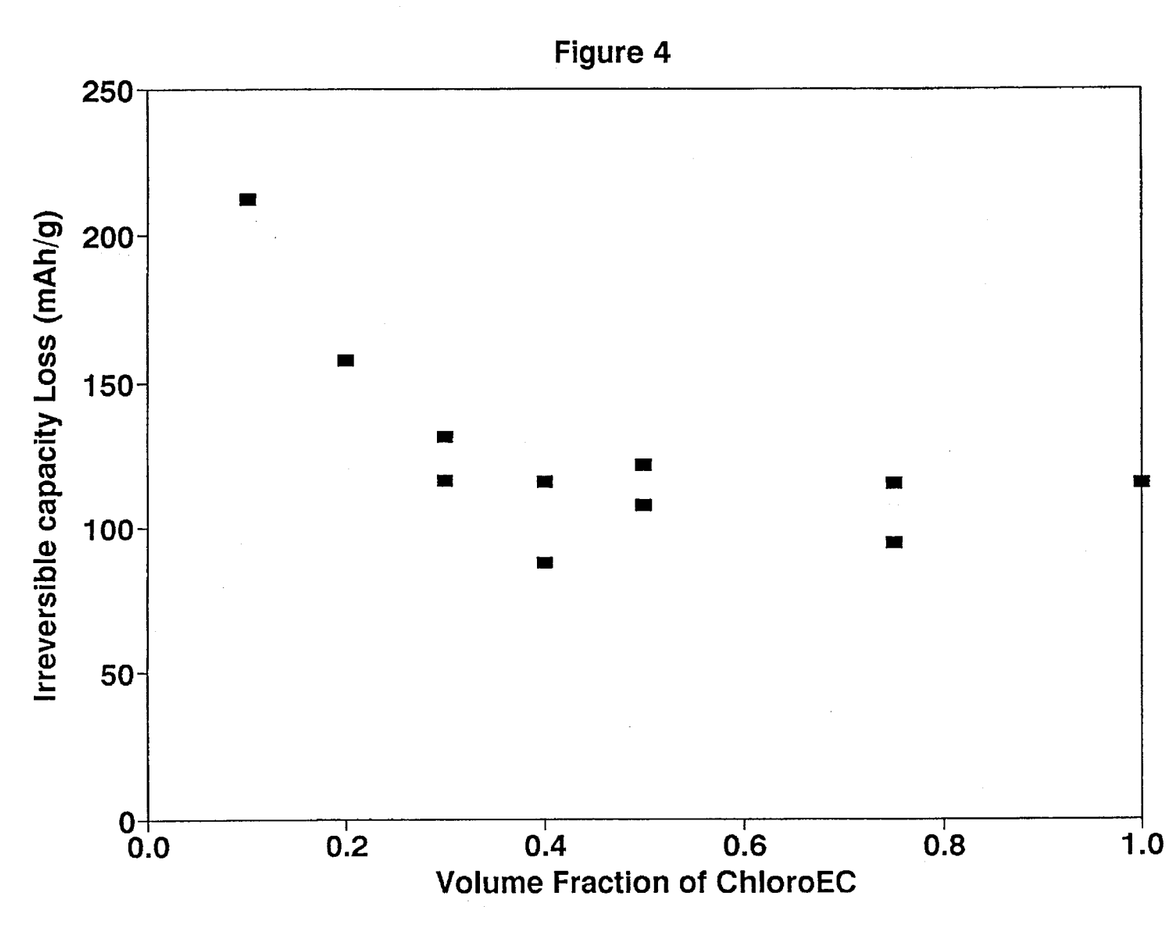
FIG. 4 is a graphical representation of the effect of the volume fraction of chloroethylene carbonate in a bi-solvent electrolyte on the irreversible capacity loss of a secondary cell.

The irreversible capacity loss in the first intercalation/de-intercalation cycle is plotted in FIG. 4 against the volume fraction of chloroethylene carbonate. It is clear from FIG. 4 that an increase in the volume fraction of chloroethylene carbonate in the electrolyte reduces the extent of the irreversible capacity loss. It is also clear that after the volume fraction reaches about 0.3, the effect of greater volume fractions of chloroethylene carbonate on the irreversible capacity loss is substantially constant. As a result, in this particular Example, the optimum concentration of chloroethylene carbonate would be a volume fraction of greater than or equal to about 0.3. FIG. 4 also illustrates that the use of a halogenated organic solvent to replace a conventional organic electrolyte solvent reduces the extent of the irreversible capacity loss found with conventional organic electrolyte solvents. The present inventors acknowledge the presence of some ethylene carbonate in the sample of chloroethylene carbonate obtained from Aldrich. However, it will be appreciated by those skilled in the art that it is reasonably inferrable from the data of Example 5 that pure chloroethylene carbonate would yield substantially the same results as shown for the test cell prepared with a 1.0 volume fraction of chloroethylene carbonate.

EXAMPLE 6

A substantially non-aqueous electrolyte was prepared in a manner known to those skilled in the art with 1M $LiClO_4$ dissolved in a conventional electrolyte solvent comprised of a 1:1 (by volume) mixture of ethylene carbonate and propylene carbonate. The electrolyte did not contain any halogenated organic solvent.

A carbonaceous electrode was made of graphite and formed into a pellet in a manner known to those skilled in the art and an Li/graphite test cell was prepared with the electrolyte. The carbonaceous electrode was lithiated by inducing the intercalation of lithium ions from a sheet of lithium metal with a current corresponding to a change of x=1 in $Li_xC_6$ over 20 hours. The carbonaceous electrode was subjected to repeated intercalation/de-intercalation cycles.

Figure 5:
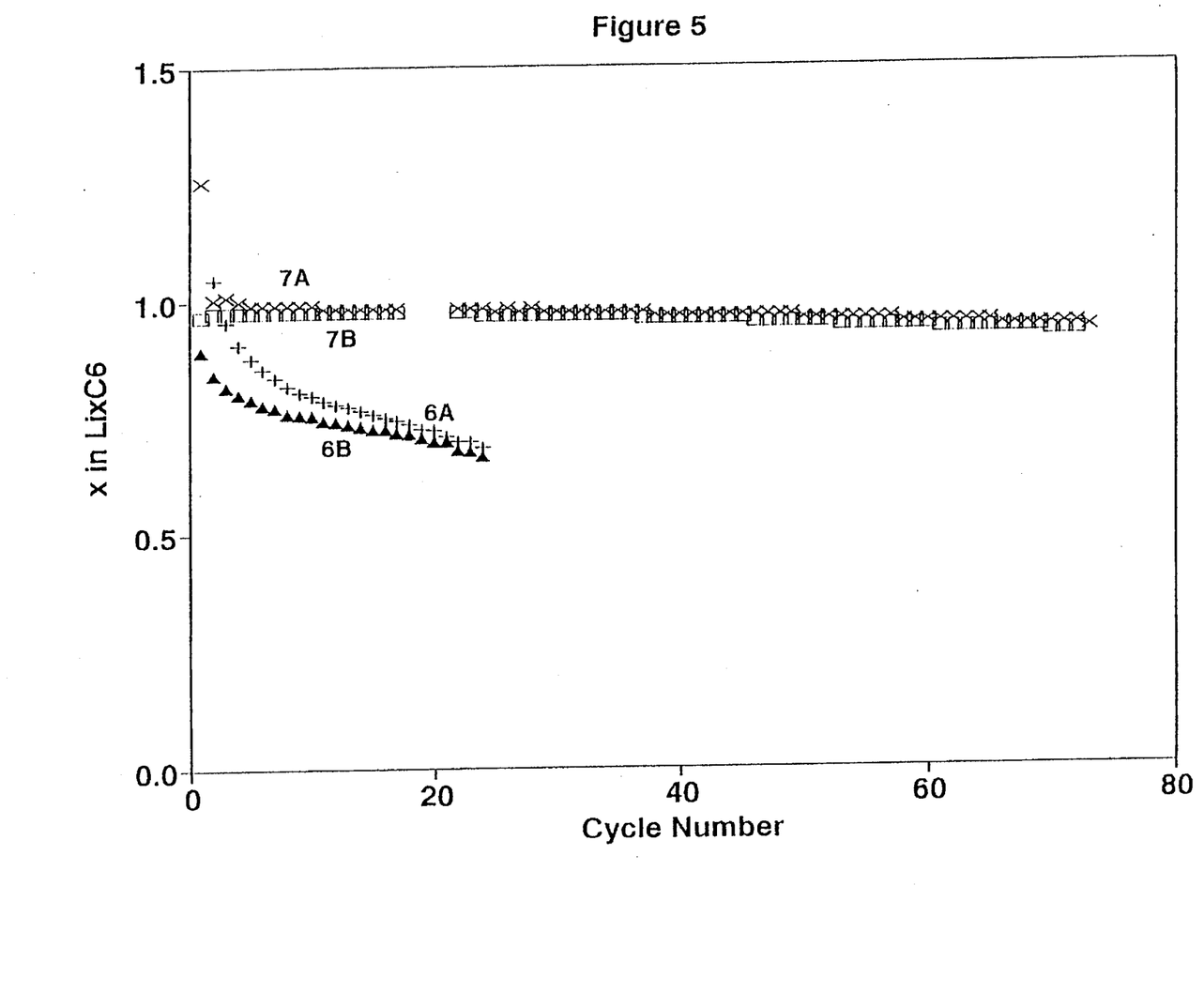
FIG. 5 is a graphical representation of the effect of repeated discharge/charge cycles on the capacity of a lithium/graphite cell prepared with a conventional electrolyte and a lithium/graphite cell prepared in accordance with an embodiment of the present invention.

Curve 6A in FIG. 5 represents the stoichiometry of the lithiated graphite after each intercalation step. The subsequent de-intercalation steps are represented by curve 6B in FIG. 5. The cell of Example 6 without halogenated organic solvent showed substantial capacity fade with each consecutive cycle.

EXAMPLE 7

A substantially non-aqueous electrolyte was prepared in a manner known to those skilled in the art with 1M $LiClO_4$ dissolved in an electrolyte solvent according to the present invention comprised of a 1:1 (by volume) mixture of chloroethylene carbonate (Aldrich) and propylene carbonate.

A carbonaceous electrode was made of graphite and formed into a pellet in a manner known to those skilled in the art and an Li/graphite test cell was prepared with the electrolyte. The carbonaceous electrode was lithiated by inducing the intercalation of lithium ions from a sheet of lithium metal with a current corresponding to a change of $x=1$ in $Li_xC_6$ over 20 hours. The carbonaceous electrode was subjected to repeated intercalation/de-intercalation cycles. Curve 7A in FIG. 5 represents the stoichiometry of the lithiated graphite after each intercalation step. The subsequent de-intercalation steps are represented by curve 7B in FIG. 5. The cell of Example 7 with halogenated organic solvent showed very little capacity fade over 60 intercalation/de-intercalation cycles.

In summary, the results of Example 6 illustrate that the passivation film formed with a conventional electrolyte is not stable to repeated intercalation and de-intercalation of alkali metal ions into the carbonaceous material during discharge/charge cycles so that concomitant electrolyte consumption and passivation film growth occurs. With repeated cell discharge/charge cycles, the internal impedance of the cell increases, resulting in a progressive loss of capacity.

Example 7 illustrates that the use of chloroethylene carbonate in the electrolyte of the present invention results in the formation of a stable passivation film. The passivation film is stable to repeated intercalation and de-intercalation of alkali metal ions into the carbonaceous material during discharge/charge cycles, thereby significantly reducing electrolyte consumption by the formation of new passivation films. Accordingly, the progressive loss of capacity found in conventional cells is significantly reduced with repeated cell discharge/charge cycles.

EXAMPLE 8

A non-aqueous electrolyte was prepared using 1M $LiClO_4$ dissolved in a tri-solvent system comprising chloroethylene carbonate/propylene carbonate/ethylene carbonate in proportions by volume of 0.05/0.475/0.475. An Li/graphite cell was prepared in a manner similar to that described in Example 2. The irreversible capacity loss in the first intercalation/deintercalation cycle was plotted in a similar manner to that depicted in FIG. 2 and the cell exhibited similar results to that of Example 2 with minimal irreversible capacity loss during the initial intercalation step. Results are shown in Table III.

EXAMPLE 9

The procedure of Example 8 was repeated in a similar Li/graphite cell using an electrolyte containing a tri-solvent system comprising chloroethylene carbonate/propylene carbonate/ethylene carbonate in volume proportions of 0.1/0.8/0.1. Similar results were obtained to those of Example 8 with minimal irreversible capacity loss. Results of the tests of Examples 8 and 9 as well as a control test for the halogen-free electrolyte of Example 1 are given in the following table:

TABLE III

| EXAMPLE | IRREVERSIBLE CAPACITY DURING INITIAL INTERCALATION STEP (mAh/g) | REVERSIBLE CAPACITY (mAh/g) |
|---|---|---|
| 1 | 955 | 321 |
| 8 | 99 | 363 |
| 9 | 97 | 347 |

EXAMPLE 10

Figure 6:
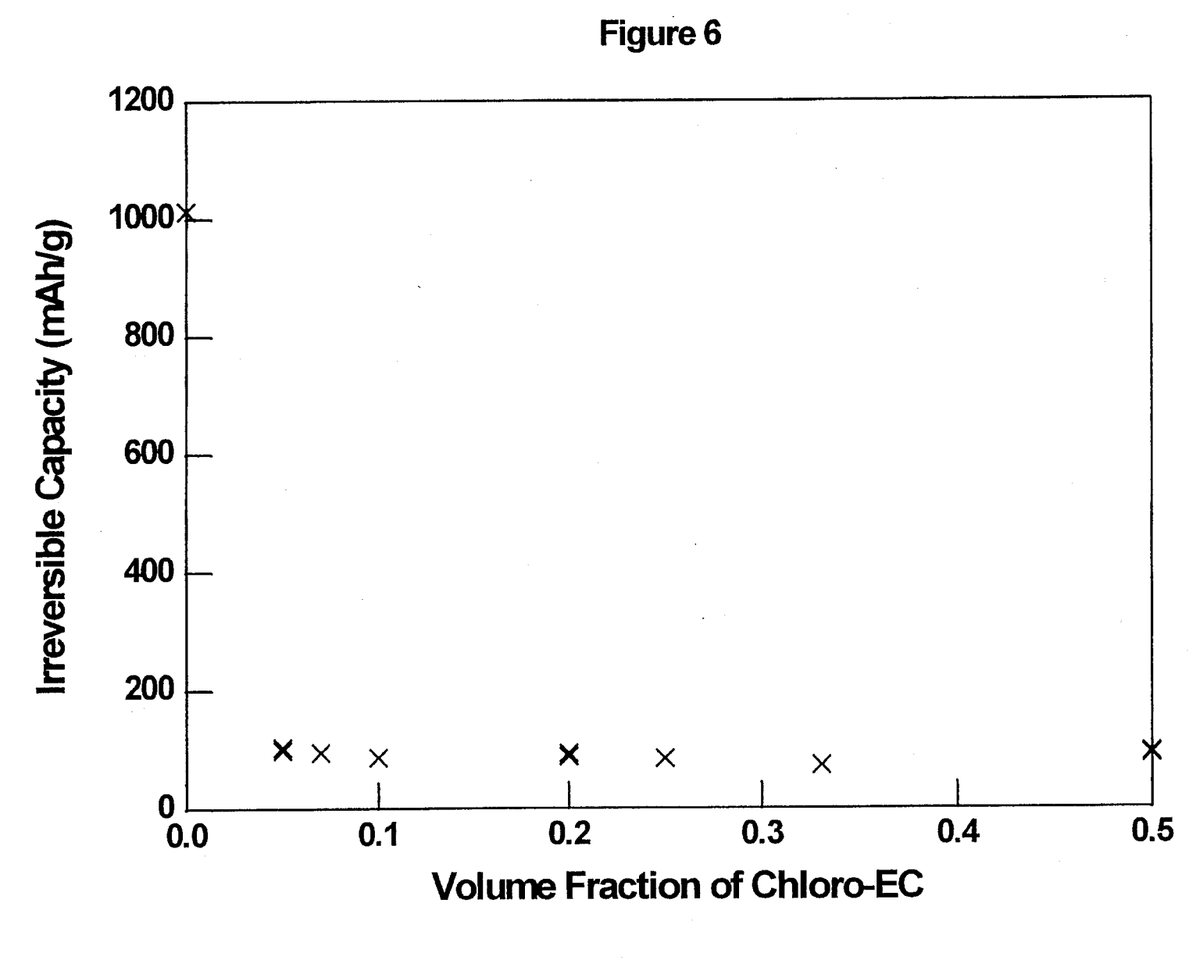
FIG. 6 is a graphical representation of the effect of varying the volume fraction of chloroethylene carbonate in a tri-solvent electrolyte on the irreversible capacity loss of a secondary cell.

Experiments were carried out in which the volume fractions of propylene carbonate (PC) and ethylene carbonate (EC) were kept equal (i.e. PC/EC volume ratio was fixed at 1:1) and the amount of chloroethylene carbonate was varied in operating an Li/graphite cell. The voltage profile (not shown) of the first cycle for the Li/graphite cell using such a tri-solvent system resembled those described in Examples 2 and 4 with a bi-solvent. However, the amount of chloroethylene carbonate required in a tri-solvent system in order to achieve the same level of reduction in electrolyte decomposition was substantially reduced. FIG. 6 shows a plot of irreversible capacity as a function of volume fraction of chloroethylene carbonate (Chloro-EC) in Chloro-EC/EC/PC. The contrast is evident from a comparison of FIG. 4 (bi-solvent electrolyte) and FIG. 6 (tri-solvent electrolyte) and it is apparent that, in the presence of EC, the volume fraction of Chloro-EC can be reduced to as low as 0.05.

EXAMPLE 11

Figure 7:
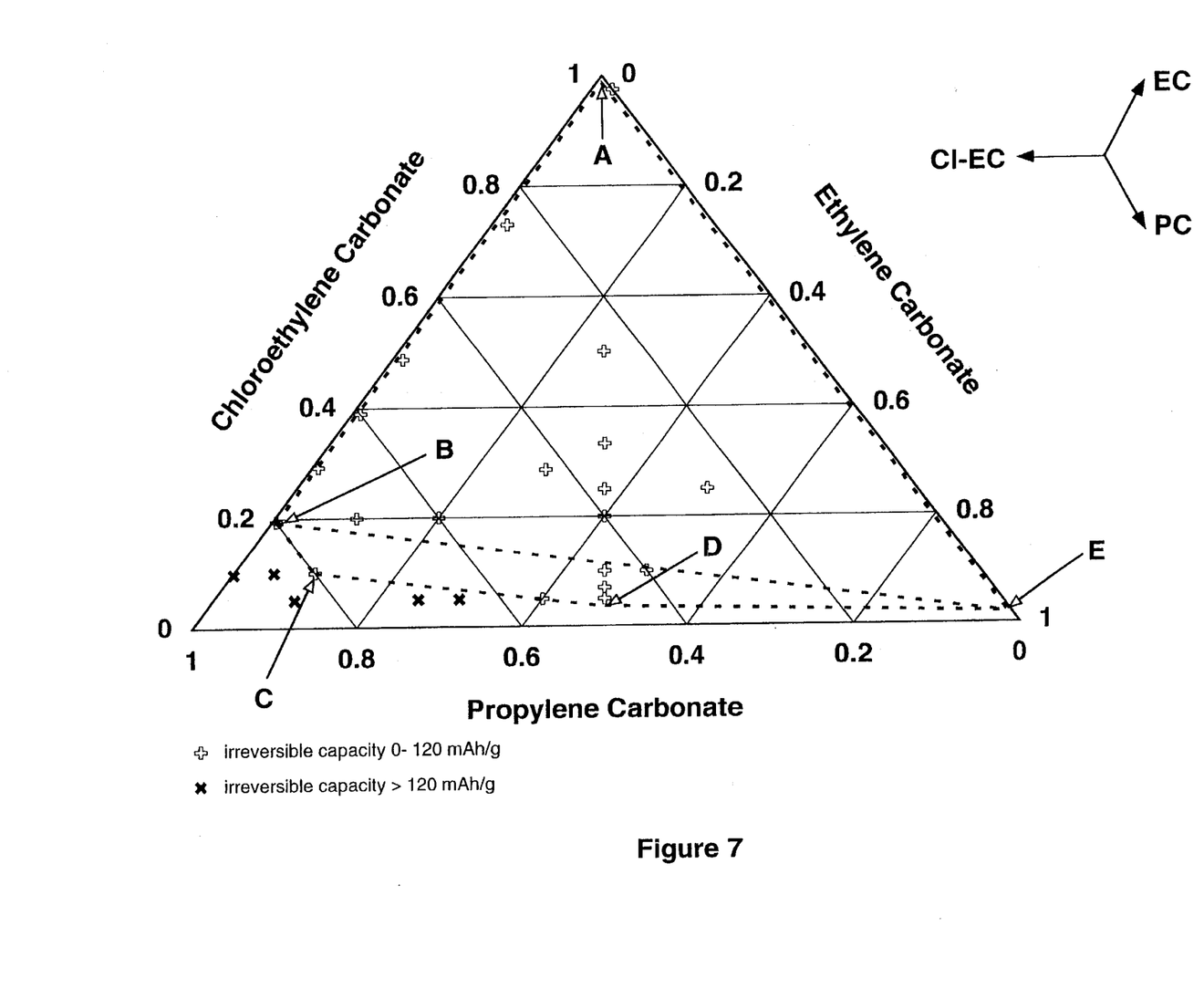
FIG. 7 is a three-component composition diagram illustrating the variation in irreversible capacity for tri-solvent electrolyte systems with differing proportions of chloroethylene carbonate, propylene carbonate and ethylene carbonate.

A substantial number of tri-solvent systems with varying proportions of PC, EC and chloro-EC were tested in an Li/graphite cell for levels of irreversible capacity loss and the results were plotted as a three-component composition diagram for chloroethylene carbonate, propylene carbonate and ethylene carbonate as shown in FIG. 7. The arrow illustration included with FIG. 7 is used to determine the solution compositions given in this figure. From the composition point of interest, one moves to the appropriate axis along the arrowed direction to read the volume fraction of that component. As a final check, the three volume fractions must sum to one.

The co-ordinates for the points A, B, C, D and E are set out in the following Table IV:

TABLE IV

| Point in three-component composition diagram | Volume proportion in electrolyte | | |
|---|---|---|---|
| | Chloro-EC | PC | EC |
| A | 0.98 | 0.01 | 0.01 |
| B | 0.20 | 0.79 | 0.01 |
| C | 0.10 | 0.80 | 0.10 |
| D | 0.05 | 0.475 | 0.475 |
| E | 0.01 | 0.01 | 0.98 |

Tri-solvent compositions falling on and within the area bounded by points A, B, C, D and E gave rise to acceptable levels of irreversible capacity of 120 mAh/g or less, whereas the area outside ABCDE recorded unacceptably high levels of more than 120 mAh/g, with some results even being above 150 mAh/g. Preferred compositions are those falling on and within the area bounded by and including points BCDE, which exhibited good results while utilizing only relatively small amounts of chloroethylene carbonate.

The foregoing Examples establish that the addition of a halogenated organic solvent to the electrolyte solvent of an electrochemical cell having a carbonaceous anode material with a high degree of graphitization substantially reduces the irreversible capacity that occurs on the initial intercalation step, with a consequential improvement in the cycling capacity of the cells.

We claim:

1. An electrolyte for a secondary alkali metal ion cell including an anode of a carbonaceous material having a degree of graphitization (g) of about 1.0, as determined by the equation:

$$g = \frac{3.45 - d_{002}}{0.085}$$

wherein $d_{002}$ represents the spacing (Å) between the graphitic layers in the crystal structure of the carbonaceous material, said carbonaceous material being capable of having alkali metal ions reversibly incorporated therein, the electrolyte comprising a solution of chloroethylene carbonate, an alkali metal salt dissolved therein, ethylene carbonate and propylene carbonate.

2. An electrolyte according to claim 1, wherein the chloroethylene carbonate, propylene carbonate and ethylene carbonate are present in the electrolyte in relative proportions by volume which fall on or within the area defined by the points ABCDE of the chloroethylene carbonate/propylene carbonate/ethylene carbonate three-component composition diagram shown in FIG. 7 of the drawings, wherein the relative proportions of chloroethylene carbonate, propylene carbonate and ethylene carbonate, respectively, are 0.98, 0.01, 0.01 for point A, 0.20, 0.79, 0.01 for point B, 0.10, 0.80, 0.10 for point C, 0.05, 0.475, 0.475 for point D and 0.01, 0.01, 0.98 for point E, the sum of said relative proportions being equal to 1.00.

3. An electrolyte according to claim 2, wherein the chloroethylene carbonate, propylene carbonate and ethylene carbonate are present in the electrolyte in relative proportions by volume which fall on or within the area defined by the points BCDE of the chloroethylene carbonate/propylene carbonate/ethylene carbonate three-component composition diagram shown in FIG. 7 of the drawings, wherein the relative proportions of chloroethylene carbonate, propylene carbonate and ethylene carbonate, respectively, are 0.20, 0.79, 0.01 for point B, 0.10, 0.80, 0.10 for point C, 0.05, 0.475, 0.475 for point D and 0.01, 0.01, 0.98 for point E, the sum of said relative proportions being equal to 1.00.

4. An electrolyte according to claim 2, wherein the alkali metal is lithium.

5. An electrolyte according to claim 2, wherein the carbonaceous material is selected from the group consisting of synthetic graphite, natural graphite, isotropic graphite, carbon fibre, pyrolytic carbon and chemically modified carbon.

6. An electrolyte according to claim 1, wherein the concentration of the alkali metal salt is in the range of from about 0.5 M to 1.5 M.

7. An electrolyte according to claim 1, further comprising an additive selected from the group consisting of crown ethers, immobilizing agents and inorganic gel-forming compounds.

8. A secondary alkali metal ion cell, comprising a source of alkali metal ions, an anode of a carbonaceous material having a degree of graphitization (g) of about 1.0, as determined by the equation:

$$g = \frac{3.45 - d_{002}}{0.085}$$

wherein $d_{002}$ represents the spacing (Å) between the graphitic layers in the crystal structure of the carbonaceous material, said carbonaceous material being capable of having the alkali metal ions reversibly incorporated therein, a cathode of an electrochemically active material capable of having the alkali metal ions reversibly incorporated therein; and a substantially non-aqueous electrolyte comprising chloroethylene carbonate, a salt of the alkali metal dissolved therein, ethylene carbonate and propylene carbonate.

9. A secondary alkali metal ion cell according to claim 8, wherein the chloroethylene carbonate, propylene carbonate and ethylene carbonate are present in the electrolyte in relative proportions by volume which fall on or within the area defined by points ABCDE of the chloroethylene carbonate/propylene carbonate/ethylene carbonate three-component composition diagram shown in FIG. 7 of the drawings, wherein the relative proportions of chloroethylene carbonate, propylene carbonate and ethylene carbonate, respectively, are 0.98, 0.01, 0.01 for point A, 0.20, 0.79, 0.01 for point B, 0.10, 0.80, 0.10 for point C, 0.05, 0.475, 0.475 for point D and 0.01, 0.01, 0.98 for point E, the sum of said relative proportions being equal to 1.00.

10. A secondary alkali metal ion cell according to claim 9, wherein the chloroethylene carbonate, propylene carbonate and ethylene carbonate are present in the electrolyte in relative proportions by volume which fall on or within the area defined by the points BCDE of the chloroethylene carbonate/propylene carbonate/ethylene carbonate three-component composition diagram shown in FIG. 7 of the drawings, wherein the relative proportions of chloroethylene carbonate, propylene carbonate and ethylene carbonate, respectively, are 0.20, 0.79, 0.01 for point B, 0.10, 0.80, 0.10 for point C, 0.05, 0.475, 0.475 for point D and 0.01, 0.01, 0.98 for point E, the sum of said relative proportions being equal to 1.00.

11. A secondary alkali metal ion cell according to claim 8, wherein the source of alkali metal ions is provided by the electrochemically active material having the alkali metal ions incorporated therein.

12. A secondary alkali metal ion cell according to claim 8, wherein the source of alkali metal ions is provided, on assembly of a secondary cell, by a sheet of alkali metal in contact with the anode, in the carbonaceous material having alkali metal ions incorporated therein, or in the electrolyte.

13. A secondary alkali metal ion cell according to claim 8, wherein the alkali metal is lithium.

14. A secondary alkali metal ion cell according to claim 8, wherein the carbonaceous material is selected from the group consisting of synthetic graphite, natural graphite, isotropic graphite, carbon fibre, pyrolytic carbon and chemically modified carbon.

15. A secondary alkali metal ion cell according to claim 11, wherein the electrochemically active material having the alkali metal ions incorporated therein is selected from the group consisting of alkali metal oxides and alkali metal sulfides of nickel, cobalt, tin, manganese, iron, chromium, titanium, vanadium, molybdenum and mixtures thereof.

* * * * *